(12) United States Patent
Tognazzini et al.

(10) Patent No.: US 6,519,584 B1
(45) Date of Patent: Feb. 11, 2003

(54) DYNAMIC DISPLAY ADVERTISING

(75) Inventors: Bruce Tognazzini, Woodside, CA (US);
Jakob Nielson, Atherton, CA (US);
Bob Glass, Los Gatos, CA (US)

(73) Assignee: Sun Microsystem, Inc., Palo Alto, CA (US)

( * ) Notice: Subject to any disclaimer, the term of this patent is extended or adjusted under 35 U.S.C. 154(b) by 1050 days.

(21) Appl. No.: 08/670,929

(22) Filed: Jun. 26, 1996

(51) Int. Cl.$^7$ .............................................. G06F 17/00
(52) U.S. Cl. ........................ 707/3; 345/769; 705/14; 705/27
(58) Field of Search .................. 707/501, 513, 707/517, 104, 3–6; 345/326, 329, 333, 334, 335, 349–340, 356–357, 700, 769, 804; 705/26, 27, 14; 382/305–306

(56) References Cited

U.S. PATENT DOCUMENTS

| 4,982,346 A | | 1/1991 | Girouard et al. | |
| 5,493,667 A | * | 2/1996 | Balogh et al. | 707/104 |
| 5,592,378 A | * | 1/1997 | Cameron et al. | 705/27 |
| 5,619,688 A | * | 4/1997 | Bosworth et al. | 707/4 |
| 5,625,776 A | * | 4/1997 | Johnson | 704/27 |
| 5,630,125 A | * | 5/1997 | Zellweger | 395/614 |
| 5,649,186 A | * | 7/1997 | Ferguson | 707/10 |
| 5,675,752 A | * | 10/1997 | Scott et al. | 395/333 |
| 5,726,898 A | * | 3/1998 | Jacobs | 364/479.01 |
| 5,732,398 A | * | 3/1998 | Tagawa | 705/27 X |
| 5,745,681 A | * | 4/1998 | Levine et al. | 705/27 X |
| 5,754,178 A | * | 5/1998 | Johnston, Jr. et al. | 345/343 |
| 5,754,850 A | * | 5/1998 | Janssen | 705/27 X |
| 5,758,328 A | * | 5/1998 | Giovannoli | 705/27 X |
| 5,774,874 A | * | 6/1998 | Veeneman et al. | 705/27 |

FOREIGN PATENT DOCUMENTS

| JP | 06 019397 | 1/1994 |
| JP | 07 129093 | 5/1995 |
| JP | 08 018521 | 1/1996 |
| WO | WO 95/16971 | 6/1995 |
| WO | WO 96/15505 | 5/1996 |
| WO | WO 96/24213 | 8/1996 |

OTHER PUBLICATIONS

"Desktop Frameworks Concepts", Taligent Documentation, http://hpsalo.cern.ch/TaligentDocs/, 1995.*
"Calculating The Insertion Point for Dragged Text Dropped on a Presentation Manager Entry Field", IBM Technical Disclosure Bulletin, vol. 37, No. 9, Sep. 1, 1994, pp. 211–213(XP 000473385).
*Drop Site catalog for Leading the User through the Drag and Drop Process*, IBM Technical Disclosure Bulletin, vol. 38, No. 08 (Aug. 1995) pp. 345–346.

* cited by examiner

Primary Examiner—Joseph H. Feild
(74) Attorney, Agent, or Firm—McDermott, Will & Emery

(57) ABSTRACT

Advertising displays such as found in mass transit vehicles or stations or in electronic newspapers are provided with user directed search capabilities. Selected text, dragged and dropped onto an image space, serves to initiate a query. If the advertising display is networked, an external search of network resources, such as those of the World Wide Web, can be undertaken and the results utilized to initiate one or more local searches.

22 Claims, 12 Drawing Sheets

DYNAMIC DISPLAY ADVERTISING

BACKGROUND OF THE INVENTION

1. Field of the Invention

This invention relates to the field of computer advertising displays such as found in a subway or in an electronic newspaper and more particularly to stand alone and networked advertising displays.

2. Description of Related Art

Newspapers are well known in the art. The individual ads run by advertisers, however, are static and usually permit only one product of a complete product line to be featured. They also limit the buyer because the buyer cannot get additional information about a product when the buyer so desires.

Stand alone advertising displays, such as advertising panels found in subways or the corridors of busy buildings are also known. Theses are subject to the same drawbacks indicated with respect to newspaper advertising.

Object oriented programming is a known form of software development that models the real world with representation of objects or modules that contain data as well as instructions that work upon that data. Objects are the basic building blocks of an object oriented program. Objects are software entities. They may model something physical like a person or they may model something virtual like checking account. Normally an object has one or more attributes (fields) that collectively define the state of the object; behavior defined by a set of methods (procedures) that can modify those attributes; and an identity that distinguishes it from other objects. Encapsulation refers to the hiding of most of the details of the object. This permits the object to be treated in a single entity. However, the set of operations associated with the object are explicit and constitute a well defined interface. One object requests another object to perform one or more operations through messaging. An object is sometimes referred to as an instance of an abstract data type or class. The programmer may define a class of objects by describing the attributes and procedures common to the class. By defining the class only once, a plurality of instances can be created by associating the class attributes and procedures with each instance and allowing the instances to differ only in their identity or in a particular value associated with the range of values permitted for the class.

Object oriented programming also permits creation of subclasses, in which class attributes and procedures can be inherited from the class by subordinate subclasses, and creation of super classes in which only the common attributes and procedures of a group of instances of various classes are retained as the defining characteristics.

SUMMARY OF THE INVENTION

The present invention provides methods, apparatus, systems and computer program products which overcome the limitations of prior art advertising display media. In particular, the invention permits a displayed ad to change to feature other products, adapting to user interest. In one form, a touch screen advertising display includes a displayed ad object, the contents of which can be changed by the user dragging and dropping a descripter of a different product onto a image space of the ad object to indicate that a search is to be undertaken. A search typically encompasses an entire catalog of the advertisers products, and the search can be utilized to bring out particular related products or to see if a text input, from another ad object or from another text object is contained within the catalog.

Such ad objects are utilized as part of an electronic newspaper and each has the same capabilities as a stand alone ad object. However, searches can occur simultaneously in a plurality of data bases for different manufacturers, all initiated by dragging and dropping text from a text source onto an image window of the ad object.

The invention relates to apparatus for displaying advertising, including a touchscreen display for displaying advertising, a memory for storing advertising, and a computer configured to display advertising and to change the advertising displayed when a user touches the touchscreen display. Advertising is stored in memory as advertising objects. Advertising objects include a logo, an image, an image description, a list of related products and a list of catalog categories. Control icons can be displayed as part of an object.

The invention also relates to a method of displaying advertising information by displaying an image and related product information, selecting a related product from the related product information, and providing an element for performing the step of replacing the image with an image of a selected related product.

The invention is also directed to a method of displaying advertising information by displaying an image and catalog information, selecting a product category from the catalog information, displaying a list of products for the product category, selecting a product from the list of products, and replacing the image with an image of a product selected from the list of products.

The invention is also directed to a method displaying information on a display, by displaying a logo, displaying an image in an image portion of the display, displaying textual information in a text portion of the display, dragging selected information from the text portion onto the image portion of the display and initiating an information retrieval search in response thereto, and displaying an image and text information related to the image resulting from the information retrieval search.

The invention also relates to a method of displaying information comprising one or more ad objects, each ad object comprising a logo, an image, and text, by assembling a plurality of the ad objects into a page of an electronic newspaper for simultaneous display to a user. Text from an ad object can be dragged onto a search object to initiate an information retrieval search for information related to the selected text. The search can occur locally or over a network, such as the world wide web. Results of the information retrieval search are displayed in a window. Text included in the results of the information retrieval search can be selected and dragged and dropped onto an image displayed as part of an ad object to initiate a search of information available to the ad object. It can also be dropped onto plural ad objects for simultaneous processing.

The invention is also directed to a system for retrieving and displaying information including a network, a plurality of computers connected to the network, each containing information accessible over the network, and a computer displaying one or more ad objects having an image area on a display, connected to the network, and configured to retrieve information accessible over the network when text related to the information is dragged and dropped from an ad object onto a search object area on the display.

The invention is also directed to computer program products for carrying out the techniques of the invention on a computer.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
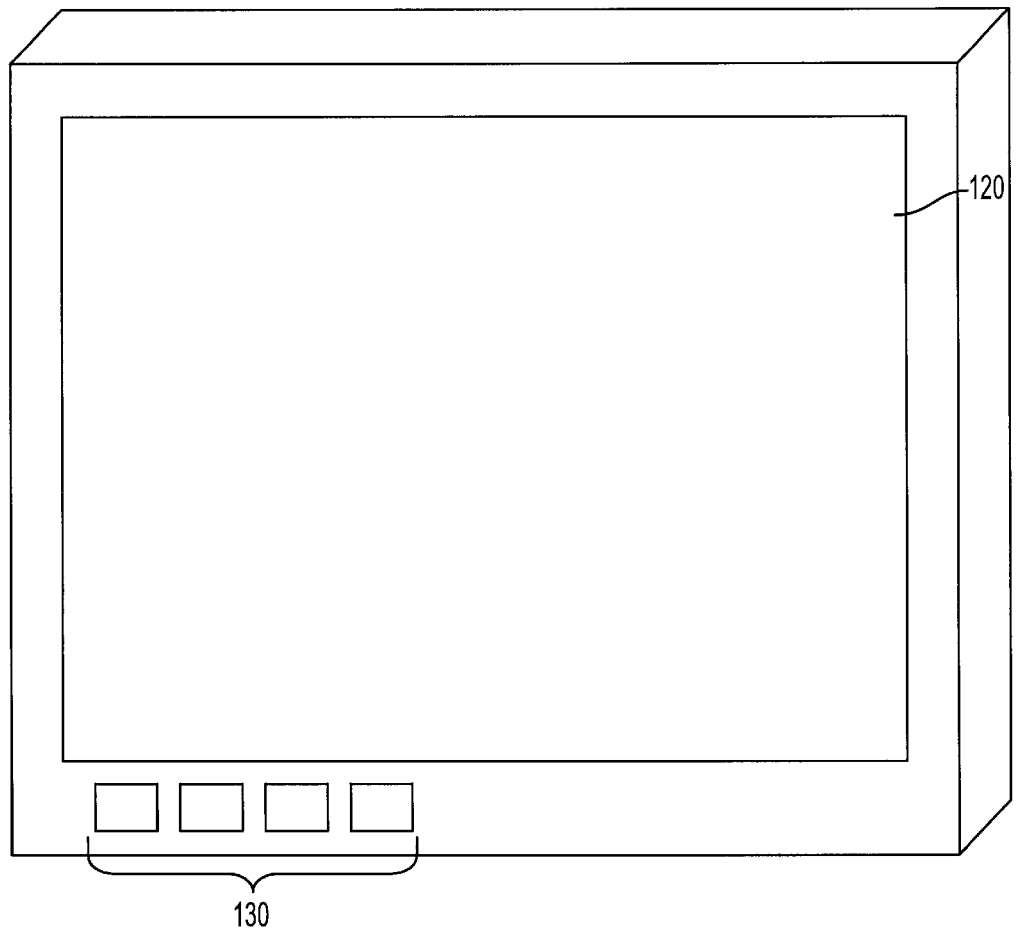
FIG. 1A is a perspective view of a stand alone advertising display.

FIG. 1A is a perspective view a stand alone advertising display in accordance with the invention. The display is in the shape of a poster or advertising panel which one sees in various public places such as subway stations, mass transit vehicles, and airports. The image displayed on the display is typical of that encountered in advertising in such places. However, in accordance with the invention, the display is a computerized display having a touch screen 120 and optional keys, 130. The optional keys can control reset, window selection and cursor control, in the event that these are desired as options. However, the touch screen panel and its functionality would normally replace the optional keys. If keys are desired using the touch screen display, they can be generated as icons. In the stand alone version shown in FIG. 1A, the unit is powered from a rechargeable battery, from a vehicle power supply or from a commercial source of power.

Figure 1B:
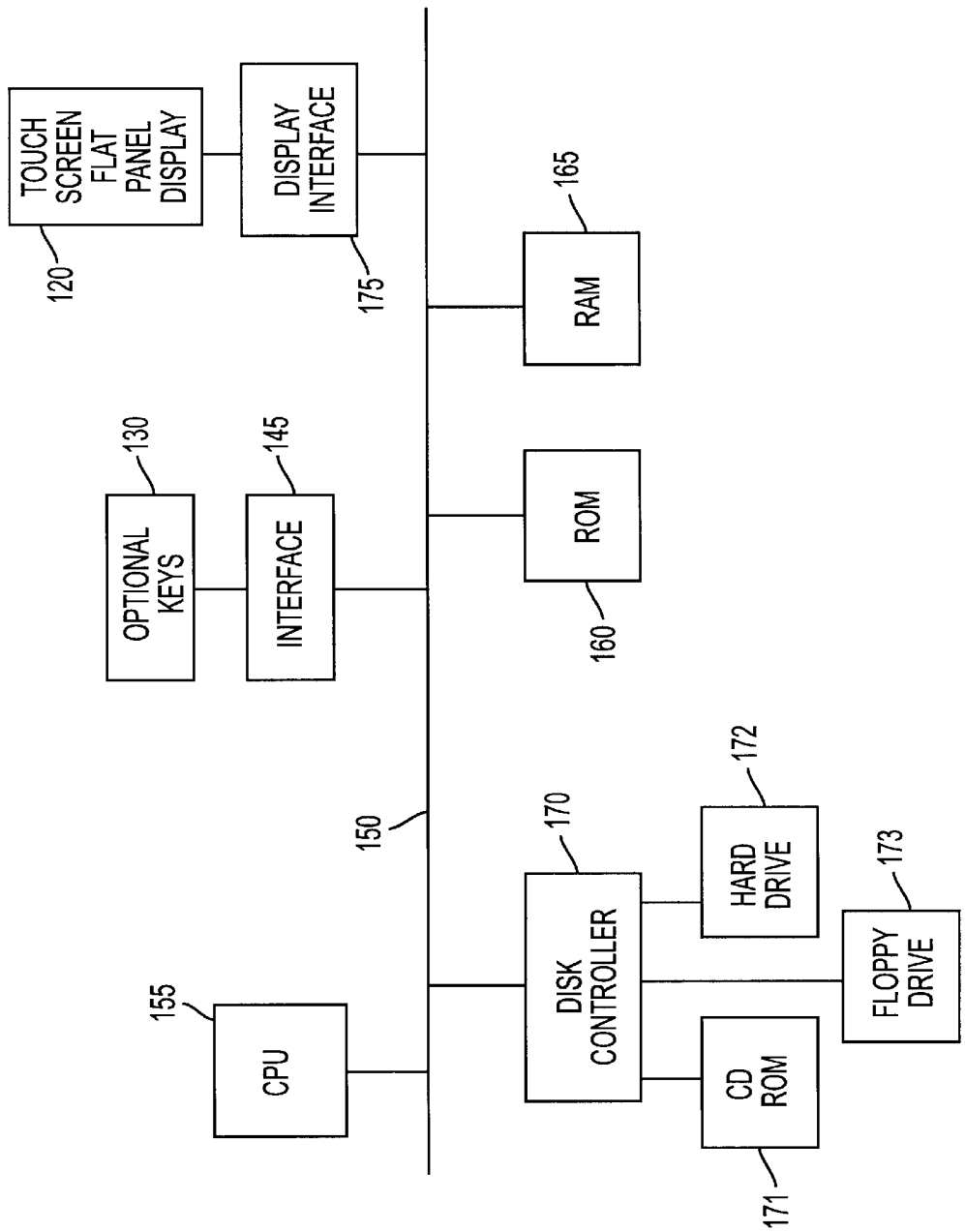
FIG. 1B is a block diagram of an exemplary construction of a computer suitable for use with the stand alone advertising display of FIG. 1A.

FIG. 1B is a block diagram of an exemplary construction of a computer for use with the advertising display of FIG. 1A. The computer system has a central processing unit 155 and disk drives 171, 172 and/or 173. Typically, an advertising unit would include a floppy disk drive such as 173, and a CD ROM drive 171. The number and type of drives varies, typically, with different computer configurations. The computer has a display 120 upon which information is displayed. A keyboard or key panel 130 typically also available as input devices over interface 145. Preferably, the computer illustrated in FIG. 7B is a SPARC work station from Sun Microsystems, Inc.

A bus 150 serves as the main information highway interconnecting the other components of the computer. CPU 155 is the central processing unit of the system, performing calculations and logic operations required to execute a program. Read only memory (160) and random access memory (165) constitute the main memory of the computer. Disk controller 170 interfaces one or more disk drives to the system bus 150. These disk drives may be floppy disk drives, such as 172, internal or external hard drives, such as 172, or CD ROM or DVD (Digital Video Disks) drives such as 171. A display interface 175 interfaces a touch screen flat panel display 120 and permits information from the bus to be displayed on the display. Communication with external devices can occur over communications port 185.

Figure 1C:
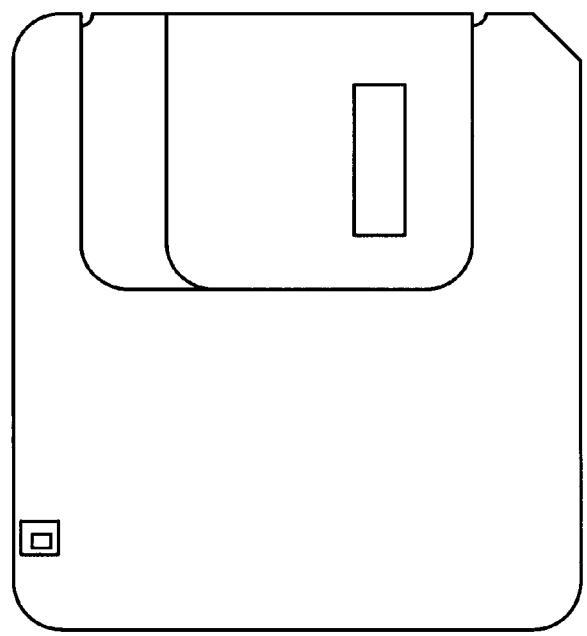
FIG. 1C is an exemplary memory medium of a type suitable for carrying data and programs for the advertising displays and computers of the invention.
Figure 2:
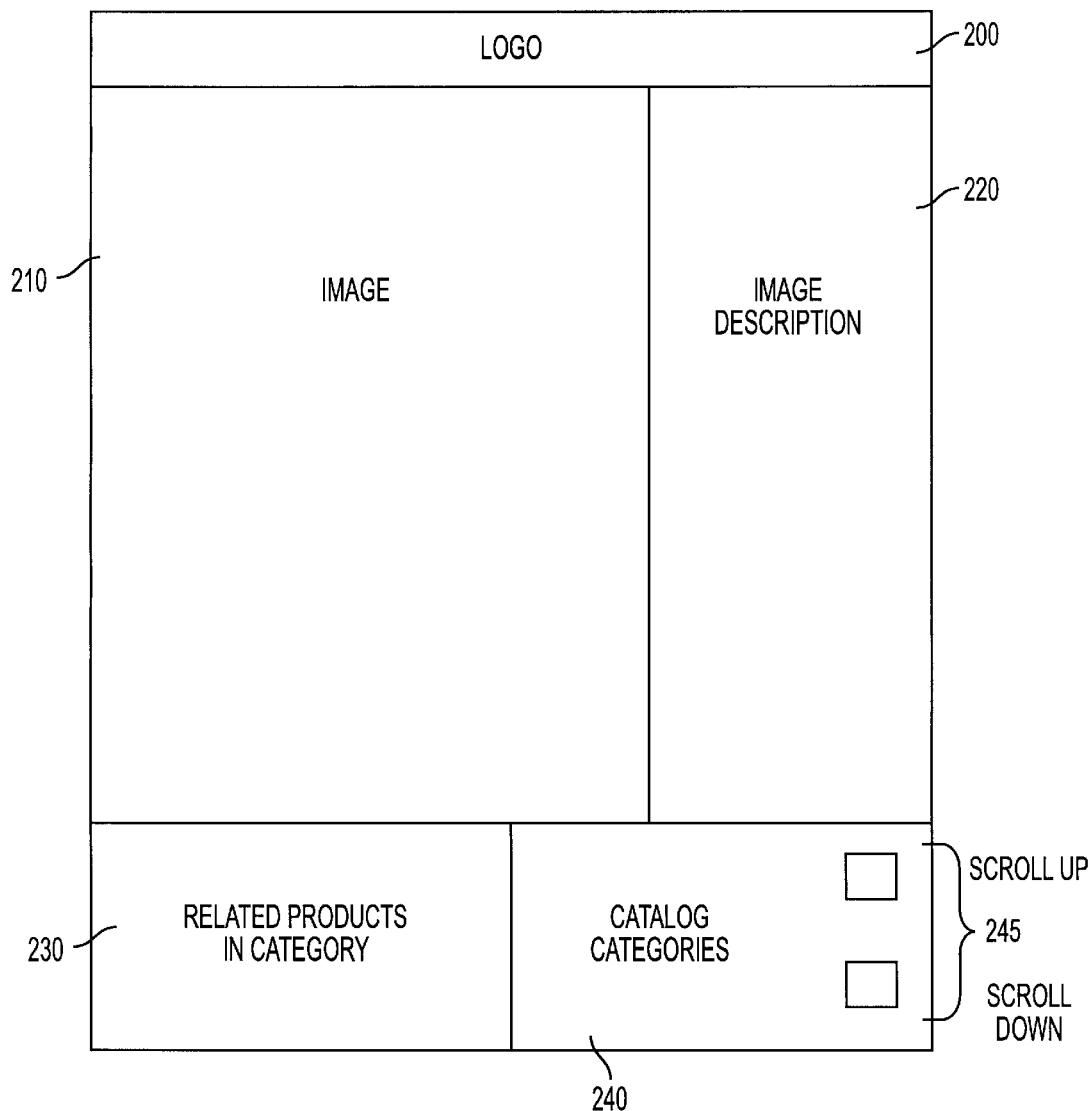
FIG. 2 is a layout of an ad object suitable for use in accordance with the invention.

FIG. 1C illustrates an exemplary memory medium which can be used with drives. Typically, memory media such as a floppy disk, CD ROM, or a Digital Video Disk will contain, inter alia, the data and program information for controlling the computer to enable the computer to perform its functions in accordance with the invention. FIG. 2 is a layout of an ad object suitable for use in accordance with the invention. An ad object is a generalization of the ad of the prior art. It consist of a plurality of sub-objects which interrelate in ways that are described more hereinafter. Instead of representing a fixed ad, an ad object is more in the nature of a work space for the user.

As shown in FIG. 2, an ad object consist of a logo 200, an image 210 and an image description 220. Thus far, the description of the ad object does not differ much from a prior art advertisement. In the prior art, the logo of the store advertising is shown together with an image and an image description. However in the prior art, this arrangement of information cannot change. In accordance with the invention, the content of the image, image description fields, objects or windows can change. Two other object are associated with the ad object. These include the related products object shown at 230 and a catalog categories object shown at 240.

In the ad object in accordance with the invention, the logo 200 is relatively fixed. That is the company who purchases the advertising would normally prefer that it's logo remained for relatively continuous observation by a user. A default image 210 and default image description 220 are also displayed. However, the ad object, in accordance with the invention, has access to, for example, the entire catalog of the manufacturer or distributor whose logo is displayed at 200. Therefore, the image and image description for a particular product may change based on interaction with the user. For whatever image is displayed in image object 210, a list of related products within the same category as the object displayed is found in related products object 230. In addition, the manufacturer or distributor may have entire catalog of a variety of diverse objects. These would be accessible in catalog categories 240. Scroll buttons 245, displayed on the screen as icons, permit one to scroll through catalog categories to select a type of object for display in image and image description objects. Preferably, the catalog would be stored on CD ROM.

In addition to the uses suggested above, an ad object of the type described could find utility in implementing a restaurant menu where a picture of food from a particular food category (e.g. appetizers or deserts) would be displayed. Such ad objects could also appear on the display screen of in-flight telephone sets.

Figure 3:
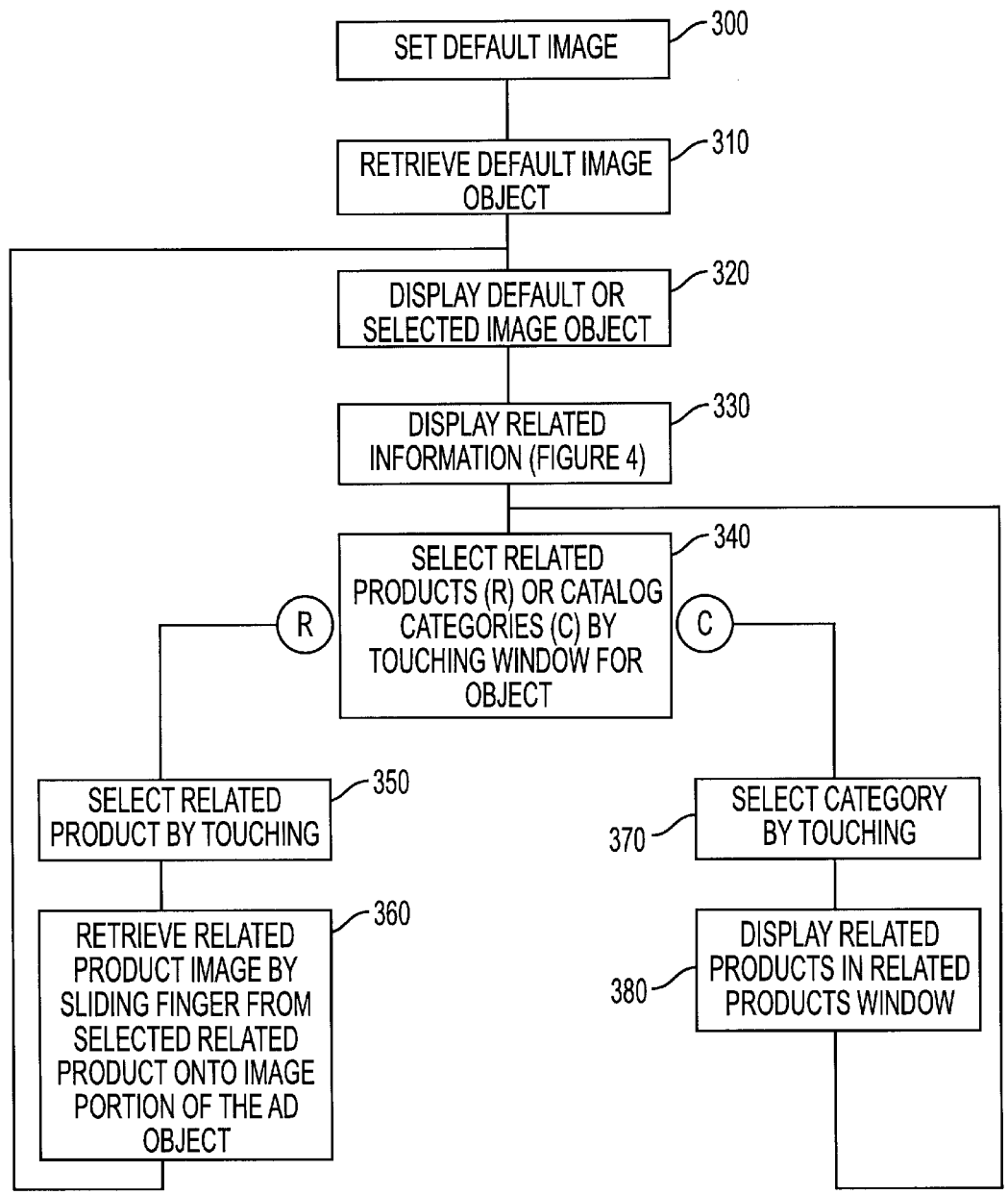
FIG. 3 is flow chart of a process suitable for use with the stand alone advertising display of FIGS. 1A and 1B.

FIG. 3 is a flow chart of a process suitable for use with the stand alone advertising display of FIGS. 1A and 1B. A default image object is specified for display on the stand alone advertising display (300). That default image is retrieved (310). Either the default image may be displayed or another selected object is discussed more hereinafter (320). When the particular image to be displayed is placed in the image window, information related to that image is displayed as described more in detail with respect to FIG. 4 (330). To change the image displayed in the ad object, one may select from related products, that is products related to the image currently being displayed or one may choose a catalog category of a different type of product for viewing (340). To select a related product, one merely touches the desired related product in the related products object (350) and the image associated with that related product will be retrieved as directed by the user sliding a finger from the selected related product onto the image portion of the ad object (360). The process then loops back to before block 320 where the selected image will be displayed together with related information (320 and 330). If a user desires an entirely new catalog category of product, the user may select from the catalog by touching the catalog entry (370). Products related to the product category touched by the user will be displayed in the related products window (380) for selection by the user and the process loops back to before block 340 where the users selection is permitted.

Figure 4:
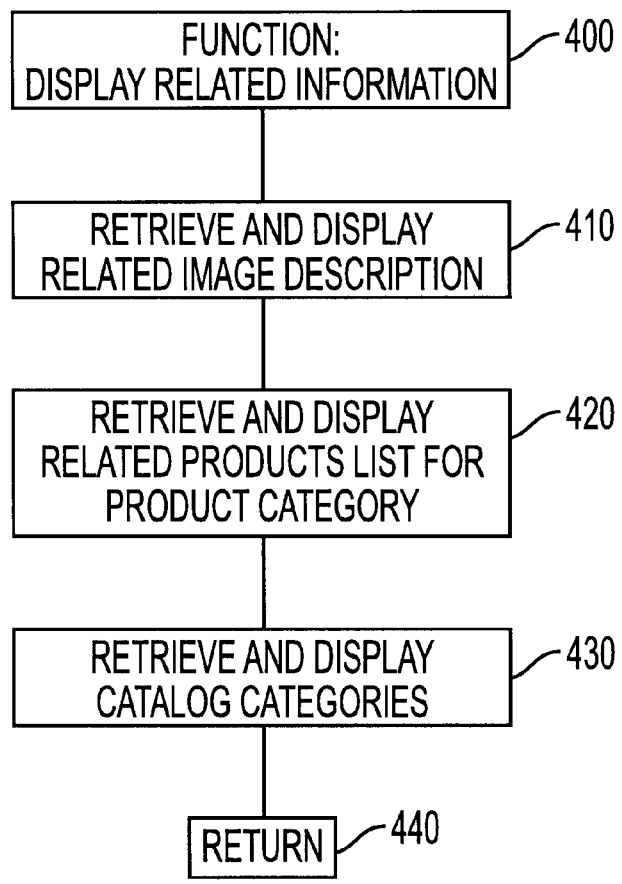
FIG. 4 is a flow chart of a display-related-information function used in FIG. 3.

FIG. 4 is flow chart of a display related-information function (400) used in FIG. 3. For the image being displayed, the corresponding related image description is retrieved and displayed (410). Then related products are displayed in the related products list for the product category belonging to the object being displayed in the image object. Then, one retrieves and displays catalog categories to complete the ad object, in the process returns.

Figure 5A:
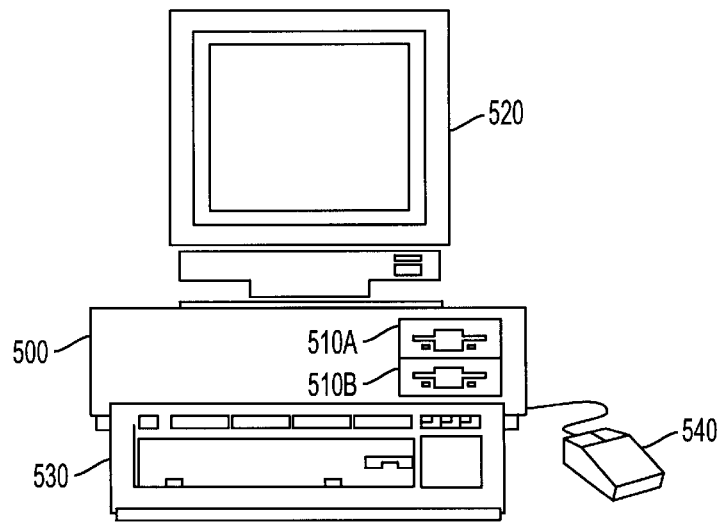
FIG. 5A is a view of a computer suitable for use as a networked advertising display.

FIG. 5A is a view of a computer suitable for use as a network advertising display. Viewed externally in FIG. 5A, a computer system has a central processing unit 500 having disk drives 510A and 510B. Disk drive indications 510A and 510B are merely symbolic of a number of disk drive which might be accommodated by the computer system. Typically, these would include a floppy disk drive such as 510A, a hard disk drive (not shown externally) and a CD ROM drive indicated by slot 510B. The number and type of drives varies, typically, with different computer configurations. The computer has the display 520 upon which information is displayed. A keyboard 530 and a mouse 540 are typically also available as input devices over interface 545. Preferably, the computer illustrated in FIG. 5A is a SPARC work station from Sun Microsystems, Inc.

Figure 5B:
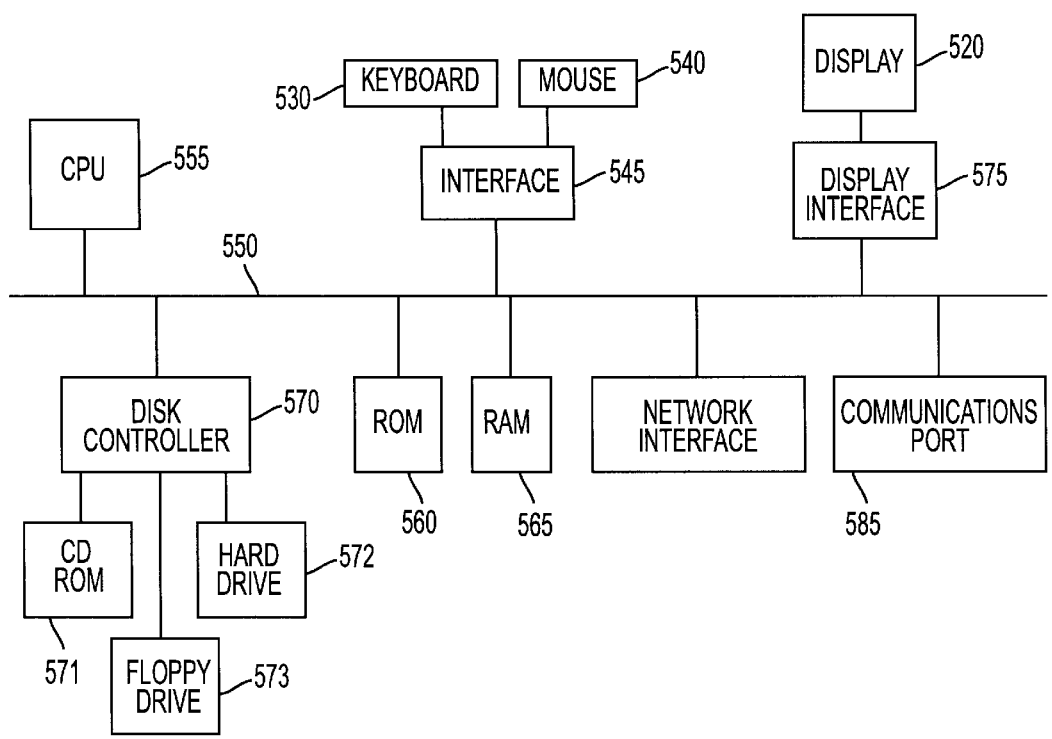
FIG. 5B is a block diagram of an exemplary construction of the computer of figure SA.

FIG. 5B illustrates a block diagram of the internal hardware of the computer of FIG. 5A. A bus 550 serves as the main information highway interconnecting the other components of the computer. CPU 555 is the central processing unit of the system, performing calculations and logic operations required to execute a program. Read only memory (560) and random access memory (565) constitute the main memory of the computer. Disk controller 570 interfaces one or more disk drives to the system 550. These disk drives may be floppy disk drives, such as 573, internal or external hard drives, such as 572, or CD ROM or DVD (Digital Video Disks) drives such as 571. A display interface 575 interfaces display 520 and permits information from the bus to be displayed on the display. Communications with external devices can occur over communications port 585. A network interface permits the computer to communicate over a network with other devices.

Figure 6:
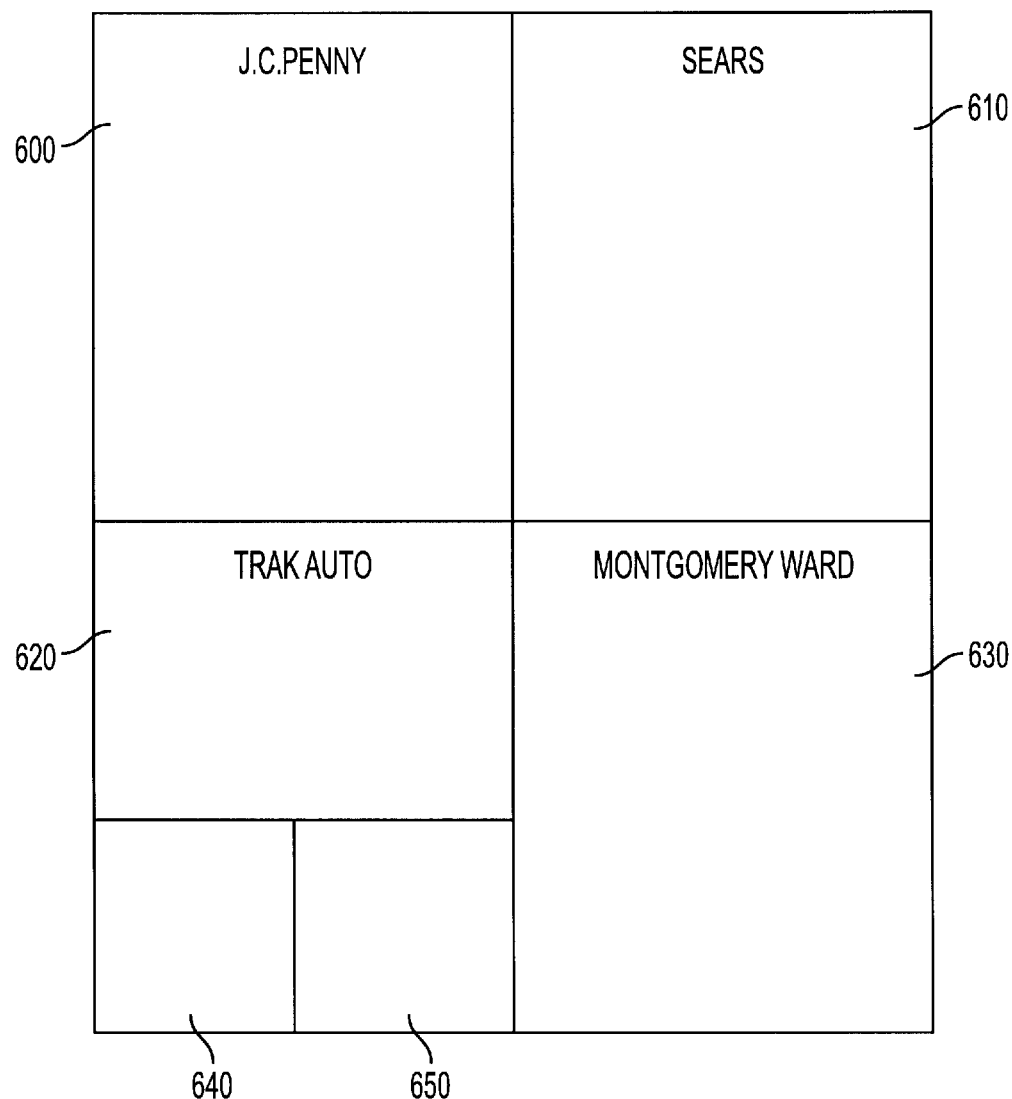
FIG. 6 is a block diagram of an exemplary advertising page of an electronic newspaper.

FIG. 6 is a block diagram of an exemplary advertising page of an electronic newspaper. In the example shown in FIG. 6, a plurality of ad objects for various manufacturers or distributors are assembled into a composite advertising page. The advertising page is typically one that might be found in an electronic newspaper. Each of the ads has a default image and text associated with it just like ads in regular newspapers. In addition, however, each has a functionality associated with the ad object described above in conjunction with FIGS. 2–4.

In the advertising page shown in FIG. 6, four ad objects are particular interest, namely the ad object 600 from J. C. Penny™, the ad object 610 from Sears™, the ad object 620 from Trak Auto™ and the ad object 630 from Montgomery Wards™. Other objects, in addition to ad objects, may be located on the advertising page, such as those unidentified objects indicated at 640 and 650.

The advertising page composite object shown in FIG. 6 permits functionality above and beyond that which has been done before. If, in the course of using one of the ad objects, one discovers in the text a model number or a universal product code for a particular type of object, to find out whether that object is available from the other advertisers shown on the composite advertising page, one need only drag and drop the model number onto the image sections of the ad objects for the manufacturer or distributor of interest. For example, if one discovered a NIKKON™ camera 752 in a Montgomery Ward ad object, dragging that model number (a text entity) onto the image space of J. C. Penny ad object 600 or Sears object 610 would result in searches of individual catalogs of each of those retailers to be undertaken to determine they had a product with a matching model number. If they did, the image of the object matching that model number together with its related information would be displayed in the ad object of the company which also carried the product.

Note that the drag and drop can occur using either a touch screen panel or a traditional mouse action. Similarly, placing the cursor in a selected window and entering textual information by keyboard would also be treated as an implicit search request with the same results. Further, if one were to drag and drop a textual item from an ad object onto the image space of the same window ad object, a search would be undertaken of the catalog to see if that product existed for that manufacturer or distributor.

Figure 7:
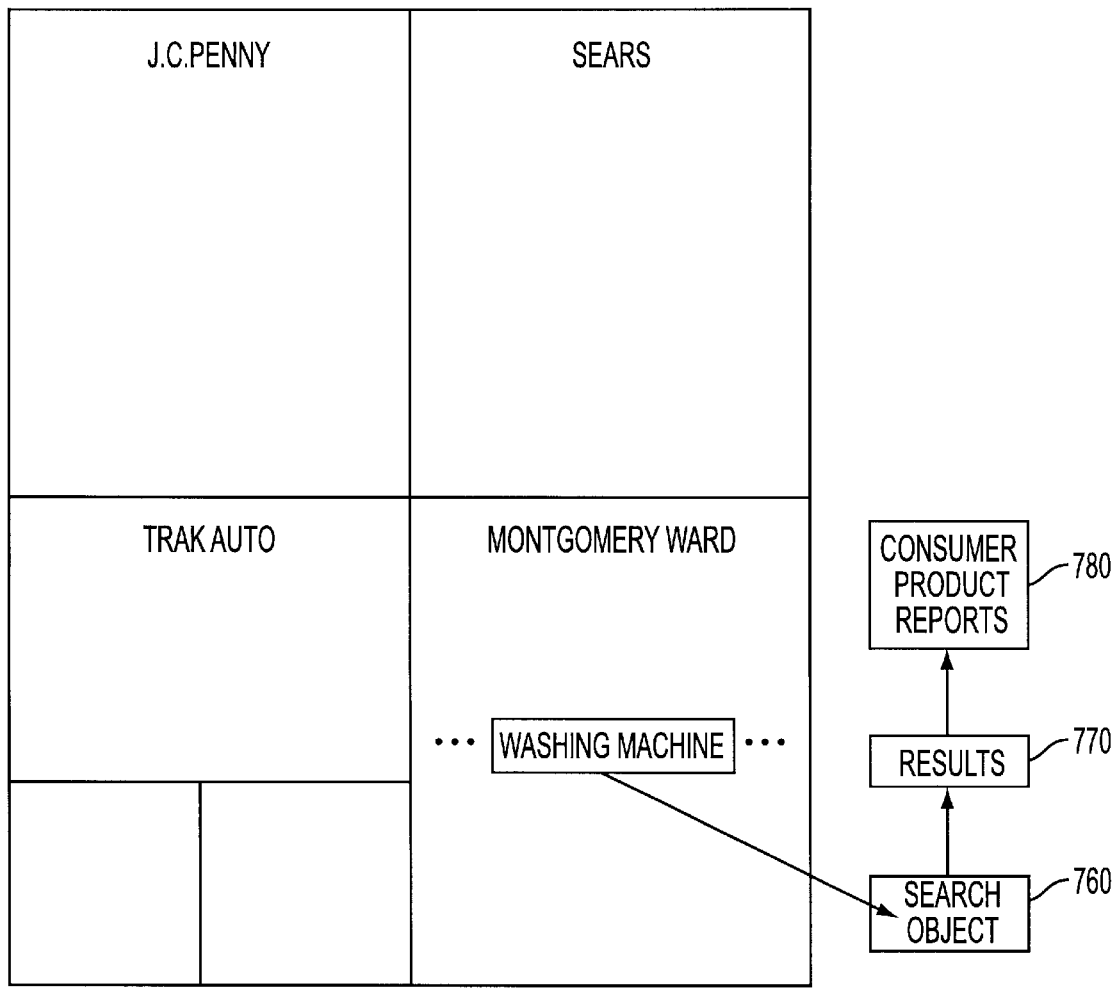
FIG. 7 illustrates how information from an advertising page can be used to initiate a search for related information.

FIG. 7 illustrates how information from an advertising page can be used to initiate a search for related information. In the course of reviewing the Montgomery Ward catalog, user may identify washing machines as a category of interest. By dragging and dropping the textual element "washing machine" onto an external search object 760, as indicated by the arrow from the Montgomery Ward ad object to the search object 760, a network search can be initiated for information about washing machines. When the search results are obtained, a results list would be displayed for viewer consideration (770). In the example shown, the search 760 may activate worldwide web search for information on washing machines. The search object would return a list of articles (770) which the user would review and select those of interest. In the example shown in FIG. 7, a consumer product report on washing machines was identified and reviewed by the user (780). There may be a plurality of types of search objects. One may search for products of the same type. Another may search for other manufacturers or distributors of the same product.

Figure 8:
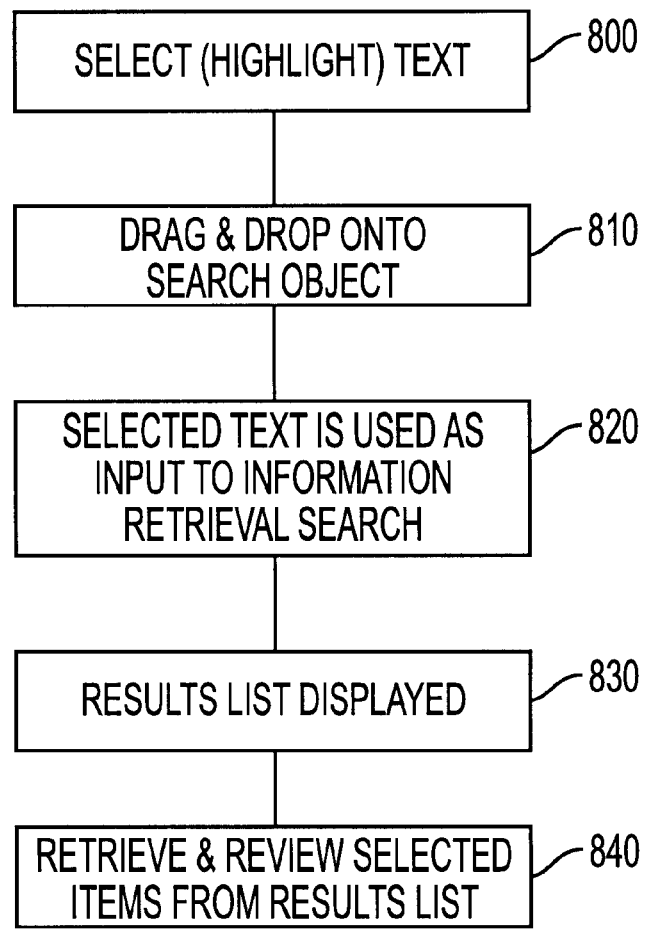
FIG. 8 is a flow chart of a process illustrated in FIG. 7.

FIG. 8 is a flow chart of the process illustrated in FIG. 7. Particular text of interest is selected and, typically highlighted (800). The user drags and drops onto a search object the highlighted text (810) and the selected text is used as input to an information retrieval search (820). A results list is displayed (830) and selected items from the results list are retrieved and reviewed (840).

Figure 9:
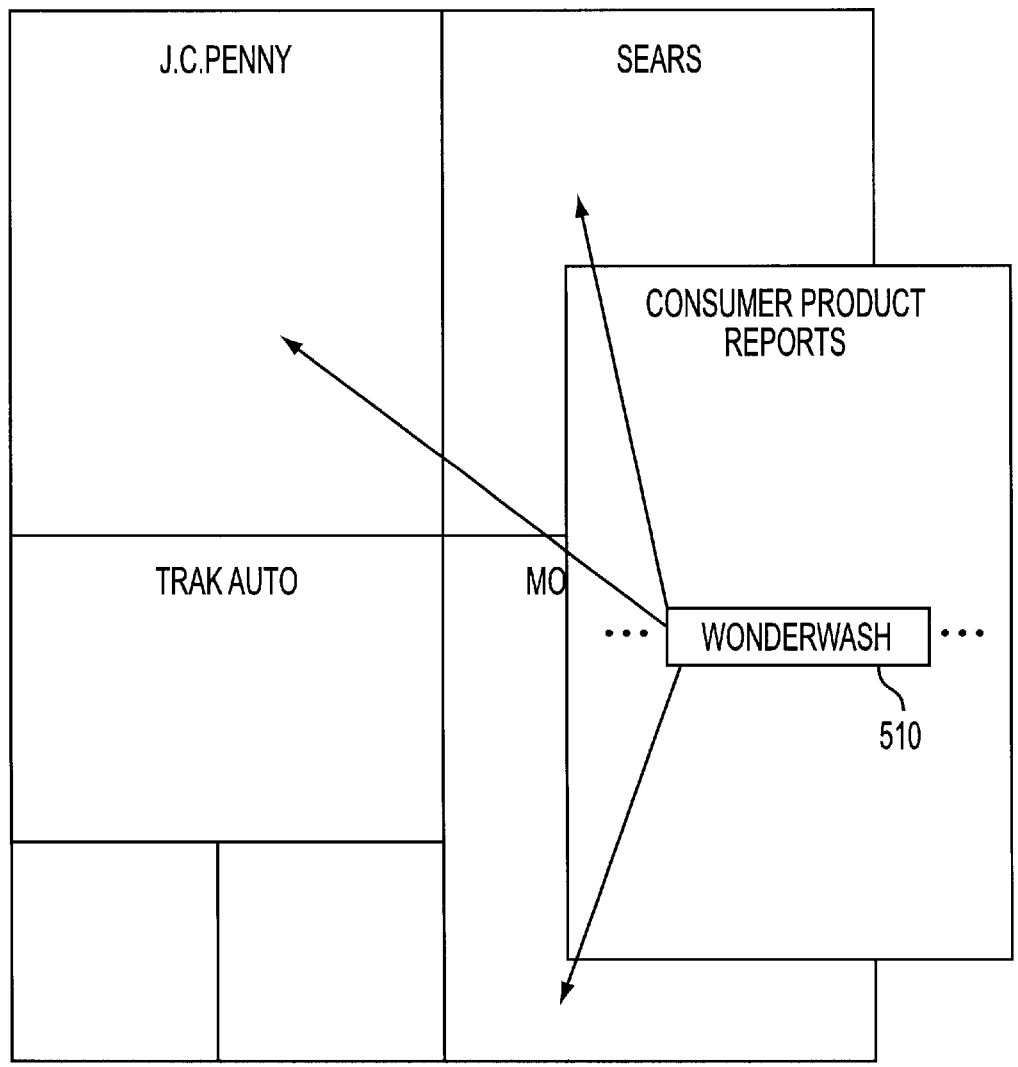
FIG. 9 illustrates how results of a search can be used to modify advertising displays.

FIG. 9 illustrates how results of a search can be used to modify advertising displays. Continuing the example beginning with respect FIG. 7, when reviewing the text of the Consumer Product Report article, 780, one may identify a particular model number or particular manufacturer and find that it got a particularly good review. One therefore wishes to know whether the model number is available from the retailers listed in the advertising on the advertising sheet of the electronic newspaper. In order to determine this, the model number, in this case "WonderWash 510", is selected and dragged and dropped onto the image space of each ad object from the retailers of interest. In example shown, the model number is dragged onto the J. C. Penny, the Sears and the Montgomery Ward objects. This then serves to initiate a search of catalogs of each of those retailers to see if the item is carried. When the results of each search are obtained, they will be displayed as a principle display item on each ad object. In short the WonderWash 510 would be displayed as the image in the J. C. Penny, the Sears and the Montgomery Wards catalogs, provided each carried the WonderWash 510. The immediate result of this is that an immediate price comparison can be made from the same product from the three retailers.

The organization of an advertising page into objects facilitates the ready rearrangement of objects into a configuration which can be customized readily for each user. If, for example, Trak Auto were not an advertiser of interest, then the Trak Auto object could be removed from the advertising page and replaced with a different retailer. Thus, an array of objects can be assembled which will facilitate quick and easy comparison shopping integrated with the ability to retrieve information from a variety of sources about any particular product desired.

Figure 10:
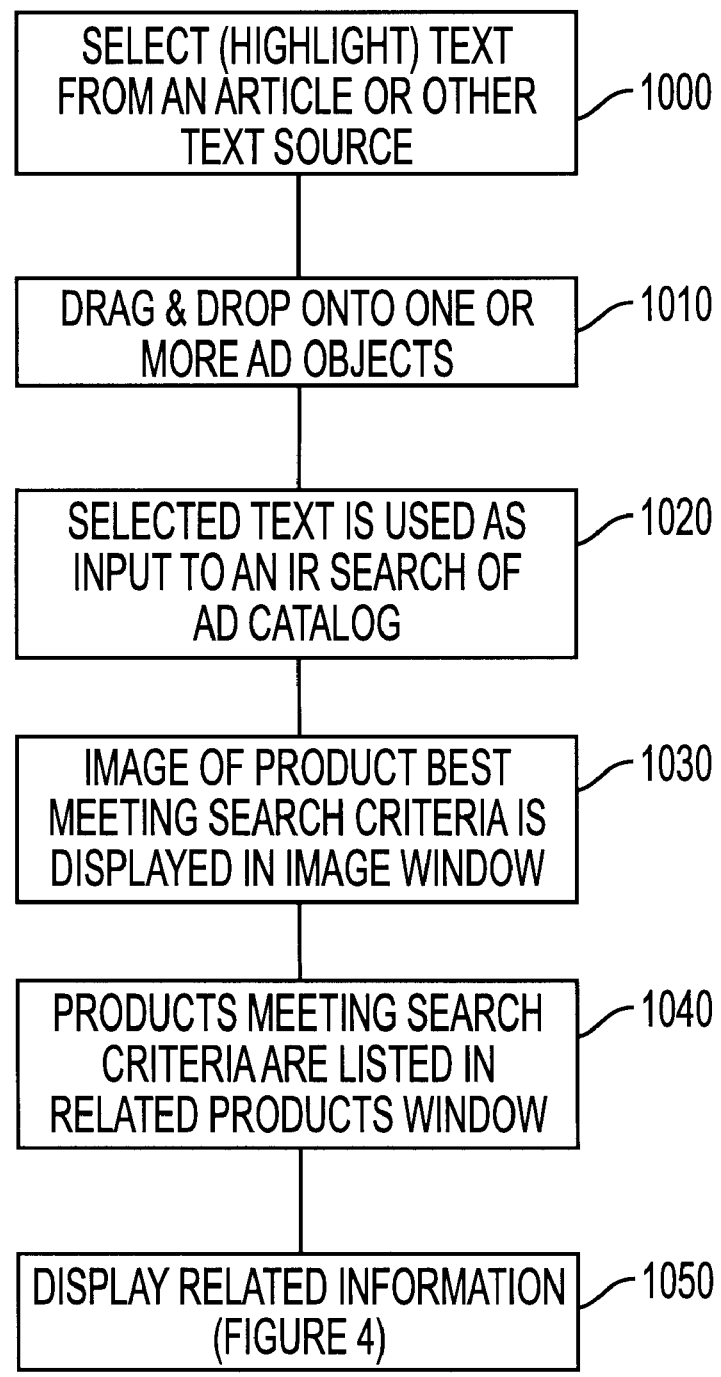
FIG. 10 is a flow chart of the process illustrated in FIG. 9.

FIG. 10 is flow chart of the process illustrated in FIG. 9. A user selects and highlights text from an article or other text source (1000). The selected text is dragged and dropped onto one or more ad objects (1010) the selected text is used as an input to an information retrieval search of an ad catalog (1020). An image of the product best meeting the search criteria is displayed in the image window of the ad object (1030) and products relating to the product best meeting the search criteria are listed in the related products window (1040). For each image displayed, in each of the ads, the related information is also displayed (1050). See FIG. 4.

Thus, in accordance with invention, dynamic display advertising has achieved which overcomes the problems and limitations of prior art display media.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A method displaying information on a display, comprising the steps of:
   a. providing an element for performing a step of displaying a logo;
   b. providing an element for performing a step of displaying an image in an image portion of said display;
   c. providing an element for performing a step of displaying textual information in a text portion of said display;
   d. providing an element for performing a step of dragging selected information from said text portion onto said image portion of said display and initiating an information retrieval search in response thereto; and
   e. providing an element for performing a step of displaying an image resulting from said information retrieval search in said image portion of said display.

2. The method of claim 1 further comprising the step of:
   providing an element for performing a step of displaying text information related to said image resulting from said information retrieval search.

3. A method of displaying information comprising one or more ad objects, each ad object comprising a logo, and image, and text, comprising the step of:
   a. providing an element for performing a step of assembling a plurality of said ad objects into a page of an electronic newspaper for simultaneous display to a user further comprising the steps of:
      b. dragging selected text from an ad object onto a search object image of another ad object to initiate an information retrieval search for information related to the selected text.

4. The method of claim 3 in which said information retrieval search occurs over a network.

5. The method of claim 4 in which said information retrieval search occurs using a search engine of the world wide web.

6. The method of claim 3 in which results of said information retrieval search are displayed in a window.

7. The method of claim 6 in which text included in said results of said information retrieval search is selected and dragged and dropped onto an image displayed as part of an ad object to initiate a search of information available to said ad object.

8. The method of claim 6 which text included in said results of said information retrieval search is selected and dragged and dropped onto respective images displayed as part of a plurality of ad objects to initiate a search of information available to said ad objects.

9. A system for retrieving and displaying information comprising:
   a. a network;
   c. a plurality of computers connected to said network, each containing information accessible over said network; and
   b. a computer displaying one or more ad objects having an image area on a display, connected to said network, and configured to retrieve information accessible over said network when text related to said information is dragged and dropped from an ad object onto a search object image area of another ad object on said display.

10. A computer program product comprising:
    a memory medium and
    a computer program stored on said memory medium, said computer program comprising displaying a logo, displaying an image in an image portion of said display, displaying textual information in a text portion of said display, dragging selected information from said text portion onto said image portion of said display and initiating an information retrieval search in response thereto, and displaying an image resulting from said information retrieval search in said image portion of said display.

11. A computer program product for displaying information comprising one or more ad objects, each ad object comprising a logo, and image, and text, comprising:
    a memory medium and
    a computer program stored on said memory medium, said computer program containing instructions for assembling a plurality of ad objects into a page of an electronic newspaper for simultaneous display to a user in which said computer program further comprises instructions for dragging selected text from an ad object onto a search object image of another ad object to initiate an information retrieval search for information related to the selected text.

12. A computer program product for displaying information comprising one or more ad objects, each ad object comprising a logo, and image, and text, comprising:
    a memory medium and
    a computer program stored on said memory medium, said computer program containing instructions for assembling a plurality of ad objects into a page of an electronic newspaper for simultaneous display to a user in which said computer program further comprises instructions for conducting said information retrieval search occurs over a network.

13. A standalone electronic poster comprising:
    a touchscreen;
    a memory for storing a plurality of advertising content for display on said touchscreen; and
    a processor configured to replace a display of a first content of the plurality of advertising content with a second content of the plurality of advertising content in response to a user's touch on the touchscreen wherein the advertising content is stored as one or more ad objects that define types of display and responses to the user's touch wherein the ad object comprises a fixed logo, a list of categories associated with the logo, a sublist of related products responsive to the user's touch on the list of categories, and a changeable image responsive to the user's touch on the sublist.

14. A standalone electronic poster comprising:
    a touchscreen;
    a memory for storing a plurality of advertising content for display on said touchscreen; and
    a processor configured to replace a display of a first content of the plurality of advertising content with a second content of the plurality of advertising content in response to a user's touch on the touchscreen wherein the advertising content is stored as one or more ad objects that define types of display and responses to the user's touch wherein each ad object is comprised of a plurality of subobjects, wherein the plurality of advertising content is stored as a database, and wherein the processor is configured to search the database and display a resulting advertising content in response to the user's touch when the touch corresponds to dragging and dropping one subobject onto another subobject.

15. A method of displaying advertising content on a standalone electronic poster having a touchscreen, a memory, and a processor, the method comprising:
    displaying on the touchscreen a plurality of ad objects, each ad object comprising a fixed logo, a changeable image and a changeable block of text;
    providing an element for dragging a selected block of text from a first ad object onto a second ad object in response to a user's touch on the touchscreen;
    searching a database of information stored in the memory for related information associated with the selected block of text and the second ad object; and
    displaying on the touchscreen the related information.

16. The method of claim 15 wherein displaying the related information comprises replacing an original changeable image in the second ad object with a new changeable image selected from the related information.

17. The method of claim 15 wherein displaying the related information comprises replacing an original changeable block of text in the second ad object with a new changeable block of text from the related information.

18. A computer program product for a standalone electronic poster having a touchscreen, a memory, and a processor, the product comprising:

a memory medium readable by the processor; and processor instructions stored on the memory medium for displaying on the touchscreen a plurality of ad objects, each ad object comprising a fixed logo, a changeable image and a changeable block of text, for providing an element for dragging a selected block of text from a first ad object onto a second ad object in response to a user's touch on the touchscreen, for searching a database of information stored in the memory for related information associated with the selected block of text and the second ad object, and for displaying on the touchscreen the related information.

19. The computer program product of claim 18 wherein the instructions comprise instructions for replacing an original changeable image in the second ad object with a new changeable image from the related information.

20. The computer program product of claim 18 wherein the instructions comprise instructions for replacing an original changeable block of text in the second ad object with a new changeable block of text from the related information.

21. A method of displaying advertising content in a vehicle on an advertising display having a touchscreen, a memory, and a processor, the method comprising:

displaying on the touchscreen a plurality of ad objects, each ad object comprising a fixed logo, a changeable image and a changeable block of text;

providing an element for dragging a selected block of text from a first ad object onto a second ad object in response to a user's touch on the touchscreen;

searching a database of information stored in the memory for related information associated with the selected block of text and the second ad object; and displaying on the touchscreen the related information.

22. A computer program product for an advertising display mounted in a vehicle, the display having a touchscreen, a memory, and a processor, the product comprising:

a memory medium readable by the processor; and processor instructions stored on the memory medium for displaying on the touchscreen a plurality of ad objects, each ad object comprising a fixed logo, a changeable image and a changeable block of text, for providing an element for dragging a selected block of text from a first ad object onto a second ad object in response to a user's touch on the touchscreen, for searching a database of information stored in the memory for related information associated with the selected block of text and the second ad object, and for displaying on the touchscreen the related information.

* * * * *

UNITED STATES PATENT AND TRADEMARK OFFICE
CERTIFICATE OF CORRECTION

PATENT NO. : 6,519,584 B1 Page 1 of 1
DATED : February 11, 2003
INVENTOR(S) : Bruce Tognazzini et al.

It is certified that error appears in the above-identified patent and that said Letters Patent is hereby corrected as shown below:

Title page,
Item [75], Inventors, "Jakob Nielson" should read -- Jakob Nielsen --;
Item [73], Assignee, "Microsystem" should read -- Microsystems --; and Column 9,
Line 23, before "which", insert -- in --.

Signed and Sealed this

Eighth Day of July, 2003

JAMES E. ROGAN
*Director of the United States Patent and Trademark Office*